AUTOMATIC MAGNETIC TAPE DROPOUT EVALUATOR

Filed July 15, 1968 3 Sheets-Sheet 1

INVENTORS.
RONALD S. COTTIN
STANLEY SCHMULEWITZ
BY Ernest F. Weinberger
Louis B. Applebaum
ATTORNEYS

AUTOMATIC MAGNETIC TAPE DROPOUT EVALUATOR

Filed July 15, 1968 3 Sheets-Sheet 2

INVENTORS.
RONALD S. COTTIN
STANLEY SCHMULEWITZ
BY Ernest F. Weinberger
Louis B. Applebaum
ATTORNEYS

AUTOMATIC MAGNETIC TAPE DROPOUT EVALUATOR

Filed July 15, 1968

INVENTORS.
RONALD S. COTTIN
STANLEY SHMULEWITZ
BY Ernest J. Weinberger
Louis B. Applebaum
ATTORNEYS United States Patent Office 3,522,525
Patented Aug. 4, 1970

3,522,525
AUTOMATIC MAGNETIC TAPE DROPOUT EVALUATOR

Ronald S. Cottin, Bronx, and Stanley Schmulewitz, Brooklyn, N.Y., assignors to the United States of America as represented by the Secretary of the Navy Filed July 15, 1968, Ser. No. 744,820
Int. Cl. G01r 33/12
U.S. Cl. 324—34 5 Claims

ABSTRACT OF THE DISCLOSURE

Apparatus for detecting and recording defective areas or dropouts in a given length of magnetic tape. A tone signal is recorded and then played back through a rectifier/amplifier from which an unfiltered and a filtered output are derived. These outputs are electrically compared and if the amplitude difference exceeds selectable limits the comparator applies an output sufficient to gate a linear sawtooth generator. The sawtooth output amplitude is a function of time and this amplitude voltage is applied to another comparator simultaneously with a standard calibrated signal. Thus, this second comparator provides an output signal only when the sawtooth generator has operated for a period greater than that set by the calibrated signal. This output is fed into a counting means which records counts for every signal recorded on the tape which is less in amplitude than specified and exists for a certain time period.

The invention described herein may be manufactured and used by or for the Government of the United States of America for governmental purposes without the payment of any royalties thereon or therefor.

BACKGROUND OF THE INVENTION

The present invention relates to a test apparatus for use in determining the uniformity of a magnetically coated recording medium and more particularly pertains to the recording of defined tape dropouts present on the magnetic tape.

DESCRIPTION OF THE PRIOR ART

In the field of magnetic tape testing it has been the general practice to count the number of "dropouts" present on a length of tape with the use of extremely complex electronic circuitry. In general, although these circuits did evaluate the tape, they are not flexible in their definition of dropout limits nor may they be operated by those unskilled in the recording art.

SUMMARY OF THE INVENTION

The general purpose of this invention is to provide an apparatus for counting the number of "dropouts" on a recorded magnetic tape. To attain this the present invention provides circuitry which first rectifies and amplifies the high frequency recorded signal and then supplies an unfiltered and a filtered output. The filtered output is attenuated and thereafter compared with the unattenuated, unfiltered signal and if the ratio thereof exceeds the selected limits the comparator provides a negative output which in turn gates a linear sawtooth generator. The generator voltage continues to rise linearly as long as it remains gated. The output of the generator is applied to a second comparator whose other input is a reference voltage equivalent to that voltage which would be attained by the generator if it remained gated for a selected period or in effect the dropout period. This second comparator, therefore, only provides an output when the dropout voltage amplitude is below some specified value and its duration is for some selected period. By counting the comparator outputs the number of dropouts may be ascertained.

An object of the present invention is to provide a simple, direct, inexpensive and reliable circuit for counting the "dropouts" on a magnetic tape.

Another object is the provision of a magnetic tape tester whose response limits may be varied and selectively altered and which can be operated by those not skilled in the art.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof.

In the accompanying drawings.

DESCRIPTION OF A PREFERRED EMBODIMENT

Figure 1:
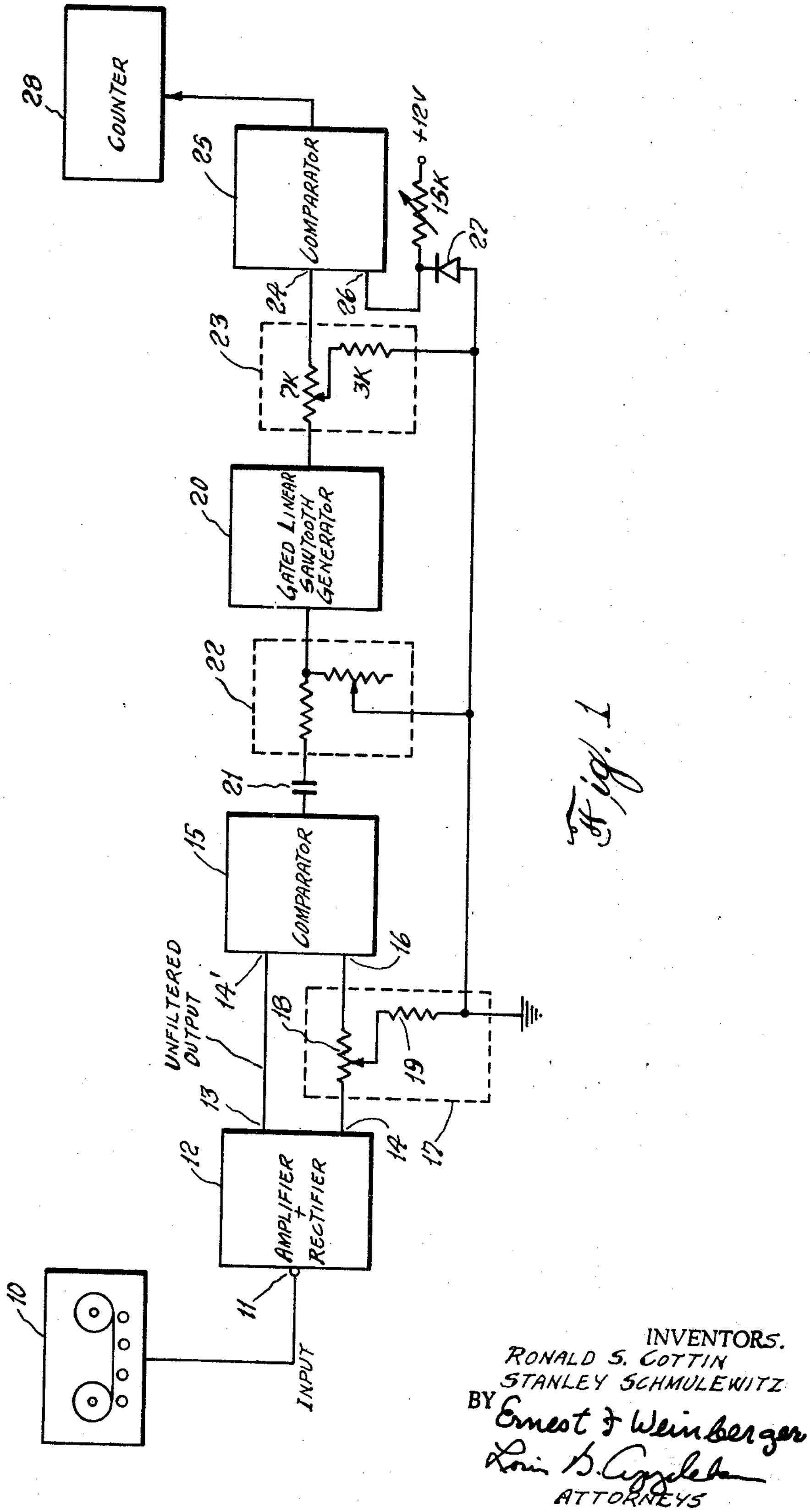
FIG. 1 is a block diagram of an embodiment made in accordance with the principles of this invention.

In the illustrated embodiment of FIG. 1, the output of a tape recorder 10 is applied to the input terminal 11 of an amplifier/rectifier 12. The tape employed to provide such output has had recorded thereon a high frequency signal (such as 70,000 cycles per second, 70 kHz.). The test signal was recorded at a constant level and of a sufficient amplitude such that it will be between 40 and 50 db above the noise level. The bias level is set to an optimum for the tape.

For the purposes of this specification a dropout is defined as a loss in signal strength which exceeds 60% of the average input and which lasts for a period exceeding 40 microseconds. These limitations of the definition of course vary, as for example, for a tape speed of 60 inches per second the above values are realistic.

Figure 2:
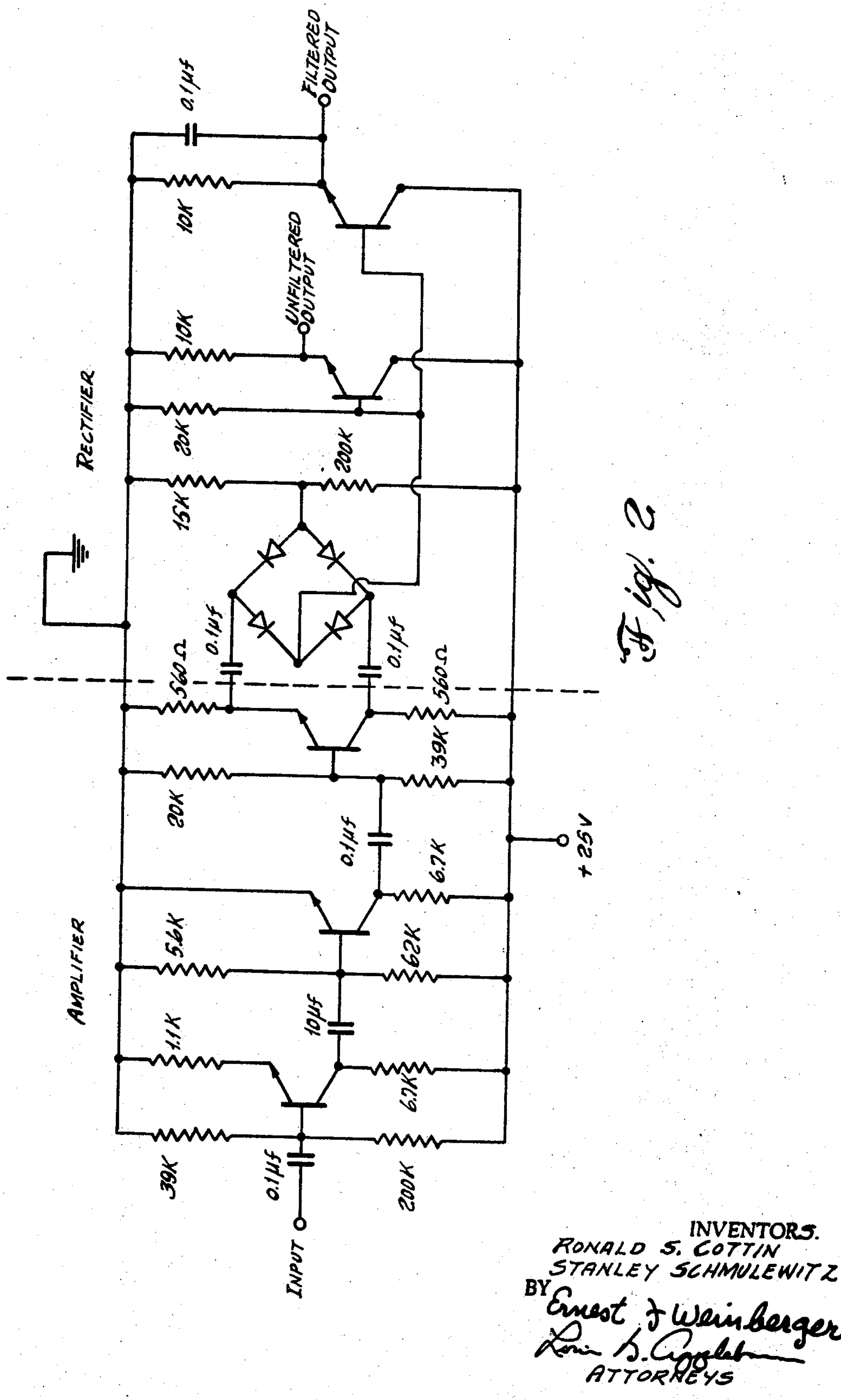
FIG. 2 is a schematic of the rectifier/amplifier.
Figure 3:
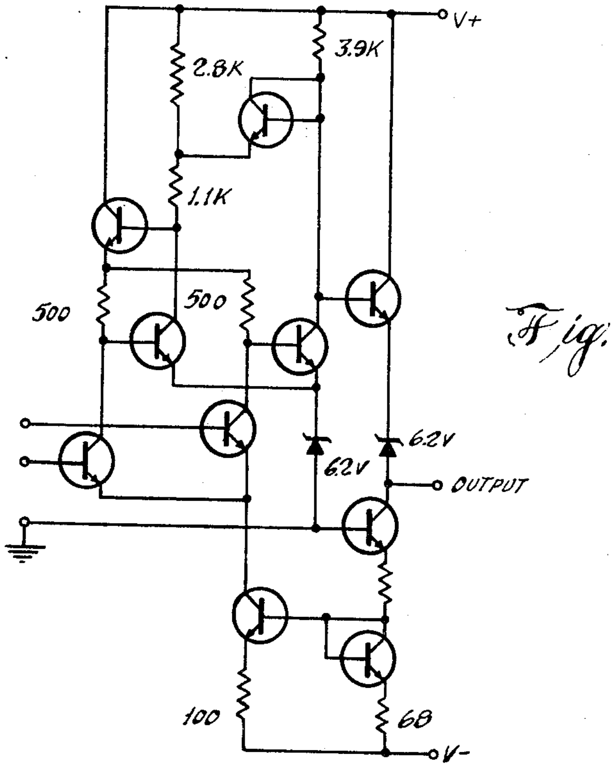
FIG. 3 is a schematic of a differential comparator.

The input from the tape playback is not fixed nor is it predetermined and therefore any amplitude variations must be entirely without reference to an absolute value. Additionally, the common technique of amplitude modulation detection cannot be employed since the variations are of such a short duration so as to make detection impractical. To overcome this a full wave rectifier-amplifier 12 is provided and has two separate outputs one, 13 being unfiltered, and the other 14, being filtered. A schematic of such a full wave rectifier/amplifier is shown in FIG. 2. The unfiltered output 13 is applied to one input 14' of a voltage comparator 15. This unfiltered output reflects the instantaneous input voltage to the rectifier/amplifier 12. The filtered output 14 (see FIG. 2, with a resistor/capacitor filter) is applied to the other input 16 of the comparator 15 through a variable attenuator resistor network 77 which consists of potentiometer 18 and fixed resistor 19. The filtered input to the comparator is generally attenuated depending on the general signal amplitude. A particularly useful comparator is the differential type and a schematic of one commercially available is illustrated in FIG. 3.

Voltage comparison is accomplished in the comparator, and the output thereof assumes either of two distinct levels. One a small negative potential and the other a positive potential depending on which of the two input levels is greater. A negative output results when the filtered output amplitude exceeds the unfiltered output of the rectifier by at least 60 percent. This figure can be adjusted by the potentiometer 18 of the attenuator 17.

Figure 4:
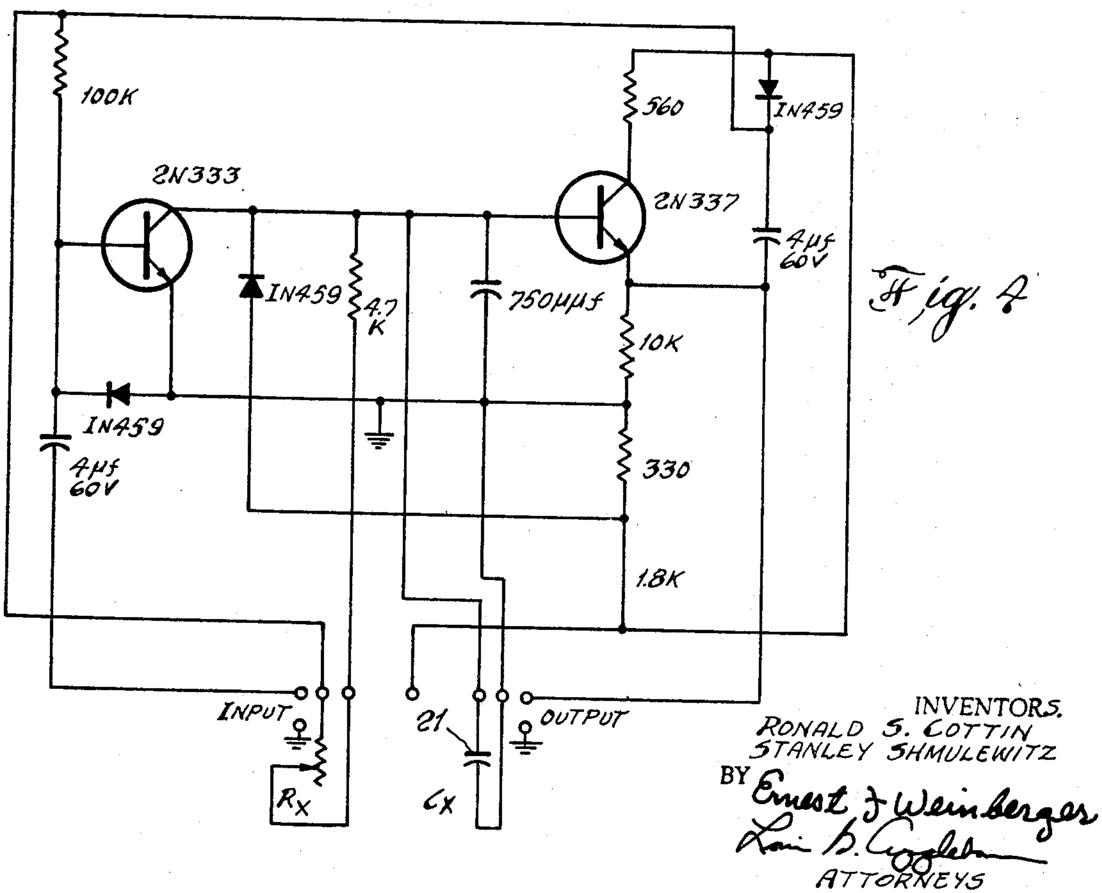
FIG. 4 is a schematic of a gated, linear sawtooth generator.

The output of the comparator is applied to the input of a gated linear sawtooth generator 20 via a coupling capacitor 21 and a fixed attenuator 22. FIG. 4 clearly illustrates one such gated sawtooth suitable for the purpose. A negative input to the generator 20 causes the output voltage of the generator to rise linearly to some preset value as for example, 20 volts over a fixed time period. Since the capacitor $C_x$ and the resistor $R_x$ determine the slope of the sawtooth output they can be adjusted to provide an output of 20 volts after the generator has been gated for a continuous period of 40 microseconds. Thus an output of 20 volts results only when the unfiltered output of the rectifier/amplifier 12 falls at least 60% below that of the filtered output. Stated in another manner, the dropout as defined exists for a period of 40 microseconds. Should the tape be run at a different speed the resistor and/or capacitor may be adjusted to provide the proper output as defined for such a dropout.

If the amplitude ratio of the unfiltered to filtered output does not define a dropout then either there will be no output or a positive output at comparator 15 which when applied to the generator 20 is equivalent to removal of the gating voltage and results in the generator output falling to zero.

The sawtooth output, if any, is applied through variable resistive attenuator 23 to one input 24 of a second comparator 25. A fixed reference voltage is applied to one input 26 of this comparator and is fixed by Zener diode 27. The reference voltage is selected to be of a value just below the voltage input from generator 20 which is attained for a specific selected time interval so as to govern the pulse duration. Comparator 25 therefore provides an output only when the tape signal output drops below a particular value and continues for at least some selected time period.

In order to permit recording of the total number of dropouts for a length of tape, the comparator 25 output is fed into a counter 28. A total count is then available. The versatility of the dropout counter arrangement hereinbefore described can be extended to cover a wide range of dropout parameters by relatively simple and direct modifications. Attenuator network 17 can be varied to change the dropout amplitude loss while the Zener diode or reference voltage can be altered to change the dropout time period.

Various modifications are contemplated and may obviously be resorted to by those skilled in the art without departing from the spirit and scope of the invention as hereinafter defined in the appended claims, as only a preferred embodiment thereof has been disclosed.

We claim:

1. A system for determining the number of signal dropouts of a magnetic recording medium on which has been recorded a continuous signal of constant amplitude and frequency, which comprises:

play-back reproduction means for reproducing said continuous signal, means, connected to said play-back means, for producing an unfiltered output indicative of the instantaneous voltage from the playback means, and a filtered output indicative of the average voltage from the playback means, said means including a rectifier and a filter;

a first variable attenuator connected to receive said filtered output and having an output, a first amplitude comparator means having a pair of inputs and providing an output when the input amplitude of one of said pair of inputs exceeds the input amplitude of the other said inputs, connection means coupling said output of said first attenuator to said one input of said first comparator and coupling said unfiltered output to said other input, linear sawtooth generator means connected to receive said comparator output, and providing an output voltage amplitude dependent on the time duration of an input thereto, a second comparator means having a pair of inputs and providing an output when the voltage level at one of said inputs exceeds the other input, and having said one input connected to receive the output of said generator, a source of variable reference voltage connected to said other input of said second comparator, and a counter means connected to receive the output of said second comparator, whereby the total number of dropouts present on said medium will be counted by said counter means.

2. The system according to claim 1 further including a second variable attenuator connected between the output of said first comparator and said generator means.

3. The system according to claim 2 wherein said generator means is a gated linear sawtooth generator.

4. The system according to claim 3 wherein said means for producing an unfiltered output includes an amplifier and wherein said rectifier is a full wave diode rectifier.

5. The system according to claim 4 wherein said source of variable voltage includes a variable resistor and a Zener diode.

References Cited

UNITED STATES PATENTS 3,185,922 5/1965 Wherry.

RUDOLPH V. ROLINEC, Primary Examiner

R. J. CORCORAN, Assistant Examiner